(12) United States Patent
Williams et al.

(10) Patent No.: US 9,057,324 B2
(45) Date of Patent: Jun. 16, 2015

(54) SIX-STROKE ENGINE SYSTEM WITH BLOWDOWN TURBOCHARGER

(71) Applicant: Caterpillar Inc., Peoria, IL (US)

(72) Inventors: D. Ryan Williams, Edwards, IL (US); Scott B. Fiveland, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 175 days.

(21) Appl. No.: 13/711,753

(22) Filed: Dec. 12, 2012

(65) Prior Publication Data
US 2014/0158069 A1    Jun. 12, 2014

(51) Int. Cl.
| | |
|---|---|
| *F02B 75/02* | (2006.01) |
| *F02B 41/04* | (2006.01) |
| *F02D 13/02* | (2006.01) |
| *F02B 37/00* | (2006.01) |
| *F02B 37/013* | (2006.01) |
| *F02D 41/00* | (2006.01) |
| *F02M 25/07* | (2006.01) |
| *F02M 23/00* | (2006.01) |

(52) U.S. Cl.
CPC .............. *F02B 75/021* (2013.01); *F02B 41/04* (2013.01); *F02M 25/0711* (2013.01); *F02M 25/0727* (2013.01); *F02M 25/0744* (2013.01); *F02M 25/0748* (2013.01); *F02D 13/0215* (2013.01); *F02D 13/0273* (2013.01); *F02D 13/0276* (2013.01); *F02M 2023/008* (2013.01); *F02B 37/001* (2013.01); *F02B 37/013* (2013.01); *F02D 41/0007* (2013.01); *Y02T 10/18* (2013.01); *Y02T 10/144* (2013.01)

(58) Field of Classification Search
CPC ............ F02B 75/021; F02B 1/04; F02B 3/06; F02B 37/00; F02M 25/074; F02M 25/0704
USPC .......... 123/64, 316, 90.16, 305, 302, 568.11, 123/568.13; 60/605.1, 605.2
See application file for complete search history.

(56) References Cited

U.S. PATENT DOCUMENTS

| 4,179,892 A | 12/1979 | Heydrich |
|---|---|---|
| 4,736,715 A | 4/1988 | Larsen |

(Continued)

FOREIGN PATENT DOCUMENTS

| JP | 03-115743 | 5/1991 |
|---|---|---|
| WO | WO 2009/081227 A1 | 7/2009 |
| WO | WO 2010/075165 A1 | 7/2010 |

*Primary Examiner* — Lindsay Low
*Assistant Examiner* — Omar Morales
(74) *Attorney, Agent, or Firm* — Leydig, Voit & Mayer, Ltd.

(57) ABSTRACT

A six-stroke engine system including an engine with a combustion chamber including an exhaust valve that expels exhaust gasses, a blowdown exhaust valve that expel blowdown exhaust gasses during recompression, and an intake valve and a blowdown compressor intake valve that introduce air. An exhaust line directs exhaust gasses to drive a turbine, which drives a compressor. An intake line receives compressed air from the compressor and directs it into the combustion chamber through the intake valve. A blowdown exhaust line, separate from the exhaust line, directs blowdown exhaust gasses from the blowdown exhaust valve to drive the blowdown turbine, which drives a blowdown compressor. A blowdown compressor line directs compressed air from the intake line into the blowdown compressor, and directs super-compressed air from the blowdown compressor through the blowdown compressor intake valve during recompression.

20 Claims, 7 Drawing Sheets

(56) References Cited

U.S. PATENT DOCUMENTS

| | | |
|---|---|---|
| 5,224,460 A | 7/1993 | Havstad et al. |
| 5,284,116 A | 2/1994 | Richeson, Jr. |
| 5,564,275 A | 10/1996 | Codan et al. |
| 6,209,324 B1 | 4/2001 | Daudel et al. |
| 6,293,092 B1 | 9/2001 | Ament et al. |
| 6,295,817 B1 | 10/2001 | Abthoff et al. |
| 6,321,731 B1 | 11/2001 | Russ et al. |
| 6,324,847 B1 | 12/2001 | Pierpont |
| 6,332,446 B1 | 12/2001 | Matsumoto et al. |
| 6,491,016 B1 | 12/2002 | Buratti |
| 6,557,779 B2 | 5/2003 | Perr et al. |
| 6,564,758 B1 | 5/2003 | Enderle et al. |
| 6,619,241 B2 | 9/2003 | Otterspeer et al. |
| 6,622,693 B2 | 9/2003 | Arndt et al. |
| 6,705,543 B2 | 3/2004 | Carroll, III et al. |
| 6,758,174 B1 | 7/2004 | Fuerhapter |
| 6,772,742 B2 | 8/2004 | Lei et al. |
| 6,807,956 B2 | 10/2004 | Gaessler et al. |
| 6,941,746 B2 | 9/2005 | Tarabulski et al. |
| 6,966,505 B2 | 11/2005 | Peterson, Jr. |
| 7,031,821 B2 * | 4/2006 | Lewis et al. .............. 701/102 |
| 7,096,848 B2 | 8/2006 | Ono et al. |
| 7,143,725 B1 * | 12/2006 | Hu .................................. 123/64 |
| 7,181,902 B2 | 2/2007 | Naik |
| 7,213,565 B2 | 5/2007 | Grünaug et al. |
| 7,264,785 B2 | 9/2007 | Blakeman et al. |
| 7,287,378 B2 | 10/2007 | Chen et al. |
| 7,418,928 B2 * | 9/2008 | Fiveland ........................ 123/64 |
| 7,422,000 B2 | 9/2008 | Kesse et al. |
| 7,426,916 B2 | 9/2008 | Reed et al. |
| 7,500,475 B2 | 3/2009 | Raymond et al. |
| 7,513,239 B2 | 4/2009 | Blessing et al. |
| 7,556,017 B2 | 7/2009 | Gibson |
| 7,574,983 B2 * | 8/2009 | Kuo ............................ 123/25 C |
| 7,597,865 B2 | 10/2009 | Mori et al. |
| 7,673,590 B2 | 3/2010 | Reed et al. |
| 7,685,990 B2 | 3/2010 | Dingle |
| 7,726,268 B2 | 6/2010 | Kelem et al. |
| 7,763,222 B2 | 7/2010 | Miyairi et al. |
| 7,867,598 B2 | 1/2011 | Miyairi et al. |
| 7,891,345 B2 | 2/2011 | Pierpont |
| 8,051,659 B2 | 11/2011 | Yamashita et al. |
| 8,096,279 B2 | 1/2012 | Kuzuyama |
| 8,136,504 B2 | 3/2012 | Winstead |
| 8,141,352 B2 | 3/2012 | Tsujimoto et al. |
| 2004/0123822 A1 * | 7/2004 | Fuerhapter ..................... 123/64 |
| 2007/0199299 A1 * | 8/2007 | Kashmerick .................. 60/39.6 |
| 2008/0092860 A2 * | 4/2008 | Bryant ......................... 123/562 |
| 2009/0145382 A1 | 6/2009 | Kawai |
| 2010/0050963 A1 * | 3/2010 | Ooyama ........................ 123/64 |
| 2010/0212300 A1 | 8/2010 | Fiveland et al. |
| 2010/0269775 A1 | 10/2010 | Chandes et al. |
| 2011/0162349 A1 | 7/2011 | Cheng et al. |
| 2011/0197852 A1 | 8/2011 | Meyman |
| 2012/0166066 A1 * | 6/2012 | Fiveland et al. ............. 701/104 |

\* cited by examiner

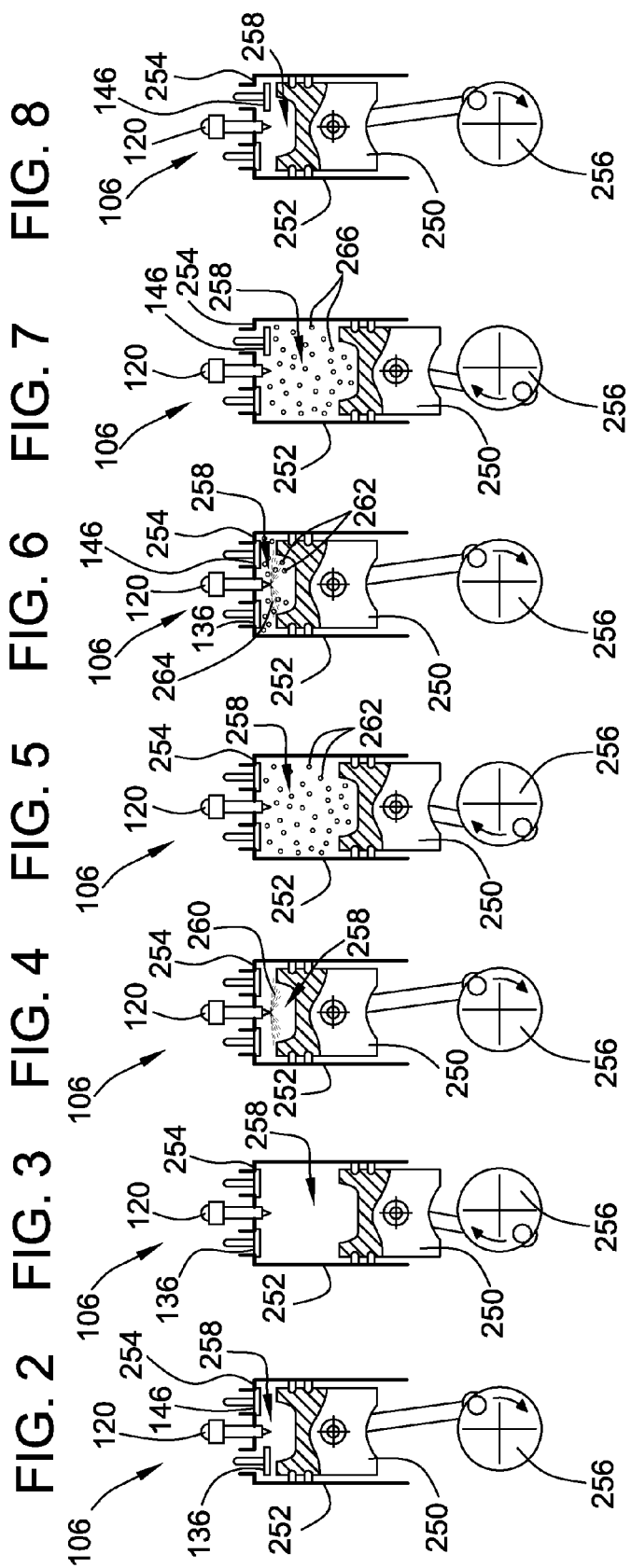

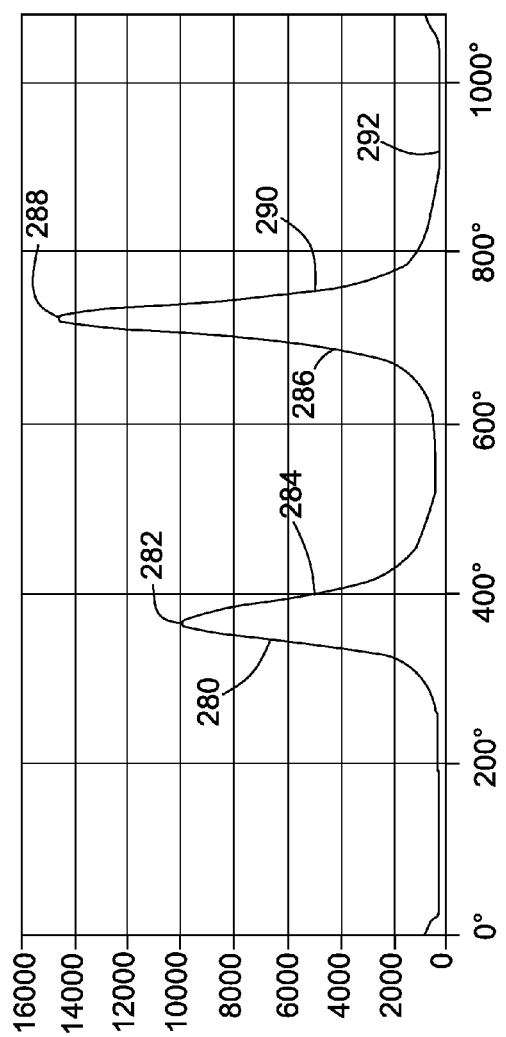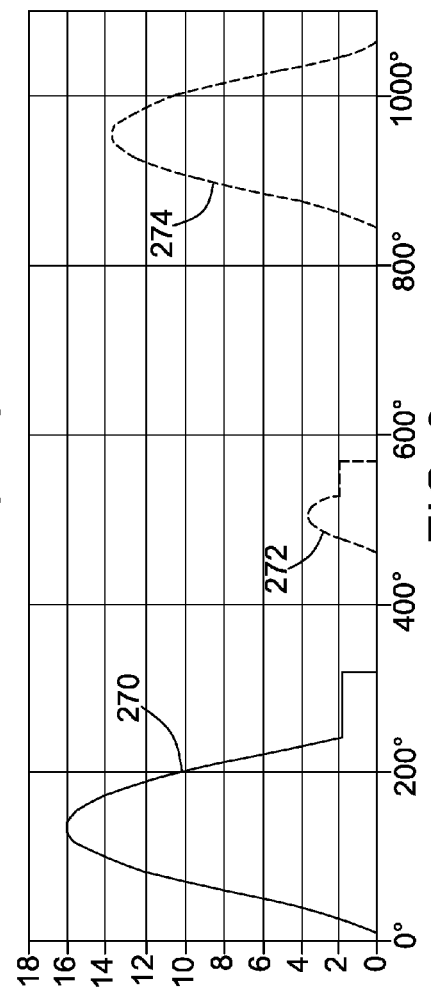

SIX-STROKE ENGINE SYSTEM WITH BLOWDOWN TURBOCHARGER

TECHNICAL FIELD

This patent disclosure relates generally to internal combustion engines and, more particularly, to internal combustion engines that are configured to operate on a six-stroke internal combustion cycle.

BACKGROUND

Internal combustion engines operating on a six-stroke cycle are generally known in the art. In a six-stroke cycle, a piston reciprocally disposed in a cylinder moves through an intake stroke from a top dead center (TDC) position to a bottom dead center (BDC) position to admit air or an air mixture that includes fuel and/or recirculated exhaust gas into the cylinder. During a compression stroke, the piston moves towards the TDC position to compress the air mixture. During this process, an initial or additional fuel charge may be introduced to the cylinder by an injector. Ignition of the compressed mixture increases the pressure in the cylinder and forces the piston towards the BDC position during a first power stroke. In accordance with the six-stroke cycle, the piston performs a second compression stroke in which it recompresses the combustion products remaining in the cylinder after the first combustion or power stroke. During this recompression, any exhaust valves associated with the cylinder remain generally closed to assist cylinder recompression. Optionally, a second fuel charge and/or additional air may be introduced into the cylinder during recompression to assist igniting the residual combustion products and produce a second power stroke. Following the second power stroke, the cylinder undergoes an exhaust stroke when the exhaust valve or valves open to permit the substantial evacuation of combustion products from the cylinder. One example of an internal combustion engine configured to operate on a six-stroke engine can be found in U.S. Pat. No. 7,418,928. This disclosure relates to a method of operating an engine that includes compressing part of the combustion gas after a first combustion stroke of the piston as well as an additional combustion stroke during a six-stroke cycle of the engine.

Some possible advantages of the six-stroke cycle over the more common four-stroke cycle can include reduced emissions and improved fuel efficiency. For example, the second combustion event and second power stroke can provide for a more complete combustion of soot and/or fuel that may remain in the cylinder after the first combustion event. Although the six-stroke method provides some advantages, its implementation with other technologies and its compatibility with other technologies has not yet been entirely understood.

SUMMARY

In one aspect, the disclosure describes an internal combustion engine system operating on a six-stroke cycle including an engine. The engine includes a combustion chamber having a piston reciprocally disposed in a cylinder to move between a top dead center position and a bottom dead center position. The combustion chamber further includes an exhaust valve adapted to open and close to selectively expel exhaust gasses from the combustion chamber during an exhaust stroke, and a blowdown exhaust valve adapted to open and close to selectively expel blowdown exhaust gasses from the combustion chamber during a recompression stroke. The combustion chamber also includes an intake valve adapted to open and close to selectively introduce air into the combustion chamber during an intake stroke, and a blowdown compressor intake valve adapted to selectively open and close to introduce air into the combustion chamber. The engine system also includes an exhaust line that communicates with the engine and a turbine. The exhaust line directs the exhaust gasses expelled from the exhaust valve to drive the turbine. The engine system includes a compressor adapted to be driven by the turbine, and an intake line communicating with the engine and the compressor.

The intake line receives compressed air from the compressor, and directs a portion of the compressed air into the combustion chamber through the intake valve. A blowdown exhaust line communicates with the engine and a blowdown turbine. The blowdown exhaust line directs blowdown exhaust gasses expelled from the blowdown exhaust valve to drive the blowdown turbine. The blowdown exhaust line is separate from the exhaust line connected to an inlet of the turbine. A blowdown compressor is adapted to be driven by the blowdown turbine, and a blowdown compressor line communicates with the engine, the blowdown compressor, and the intake line downstream of the compressor. The blowdown compressor line directs a portion of the compressed air from the intake line into the blowdown compressor, and directs super-compressed air from the blowdown compressor into the engine through the blowdown compressor intake valve. The super-compressed air is introduced through the blowdown compressor intake valve into the combustion chamber during the recompression stroke.

In another aspect, the disclosure describes a method of reducing emissions from an internal combustion engine operating a six-stroke cycle. The method includes opening an intake valve to introduce air into a combustion chamber of the internal combustion engine during an intake stroke, and closing the intake valve to halt the intake of air into the combustion chamber between commencement and completion of the intake stroke. The method also includes compressing the air in the combustion chamber during a first compression stroke, and introducing a first fuel charge into the combustion chamber during the first compression stroke to form a compressed fuel and air mixture. The method also includes combusting the compressed fuel and air mixture in the combustion chamber at the completion of the first compression stroke, thereby expanding the fuel and air mixture during a first power stroke and resulting in intermediate combustion products within the combustion chamber. The method includes compressing at least part of the intermediate combustion products within the combustion chamber during a second compression stroke, and opening a blowdown exhaust valve to expel at least a portion of the intermediate combustion products as blowdown exhaust gasses from the combustion chamber between commencement of the first power stroke and completion of the second compression stroke.

The method includes using the blowdown exhaust gasses to drive a blowdown turbine, and driving a blowdown compressor with the blowdown turbine. The method includes opening a blowdown compressor intake valve to introduce super-compressed air from the blowdown compressor into the combustion chamber during the second compression stroke, and closing the blowdown exhaust valve to halt expulsion of blowdown exhaust gasses from the combustion chamber between commencement of the first power stroke and completion of the second compression stroke. The method includes closing the blowdown compressor intake valve to halt the introduction of super-compressed air into the combustion chamber between commencement of the first power stroke and completion of the second compression stroke. The method includes combusting the compressed fuel and air mixture in the combustion chamber at the completion of the second compression stroke, thereby expanding the fuel and air mixture during a second power stroke and resulting in second combustion products within the combustion chamber. The method includes opening an exhaust valve to expel at least a portion of the second combustion products from the combustion chamber as exhaust gasses. The method includes directing the exhaust gasses to drive a turbine, driving a compressor with the turbine, and directing compressed air from the compressor to the blowdown compressor.

In yet another aspect, the disclosure describes a machine that includes an engine. The engine includes a combustion chamber that includes a piston reciprocally disposed in a cylinder to move between a top dead center position and a bottom dead center position. The combustion chamber further includes an exhaust valve adapted to open and close to selectively expel exhaust gasses from the combustion chamber during an exhaust stroke, and a blowdown exhaust valve adapted to open and close to selectively expel blowdown exhaust gasses from the combustion chamber during a recompression stroke. The combustion chamber includes an intake valve adapted to open and close to selectively introduce air into the combustion chamber during an intake stroke, and a blowdown compressor intake valve adapted to selectively open and close to introduce air into the combustion chamber. The engine also includes an exhaust line communicating with the combustion chamber and a turbine. The exhaust line directs the exhaust gasses expelled from the exhaust valve to drive the turbine, and a compressor is adapted to be driven by the turbine. The engine includes an intake line that communicates with the combustion chamber and the compressor.

The intake line receives compressed air from the compressor, and directs a portion of the compressed air into the combustion chamber through the intake valve. The engine also includes a blowdown exhaust line communicating with the combustion chamber and a blowdown turbine. The blowdown exhaust line directs blowdown exhaust gasses expelled from the blowdown exhaust valve to drive the blowdown turbine. The blowdown exhaust line is separate from the exhaust line connected to an inlet of the turbine. A blowdown compressor is adapted to be driven by the blowdown turbine, and a blowdown compressor line communicates with the combustion chamber, the blowdown compressor, and the intake line downstream of the compressor. The blowdown compressor line directs a portion of the compressed air from the intake line into the blowdown compressor, and directs super-compressed air from the blowdown compressor into the combustion chamber through the blowdown compressor intake valve. The super-compressed air is introduced through the blowdown compressor intake valve into the combustion chamber during the recompression stroke.

BRIEF DESCRIPTION OF THE DRAWINGS

FIGS. 2-8 are cross-sectional views representing an engine cylinder and a piston movably disposed therein at various points during a six-stroke combustion cycle in accordance with the disclosure.

FIG. 9 is a chart representing the lift of an intake valve and an exhaust valve for an engine cylinder as measured against crankshaft angle for a six-stroke combustion cycle in accordance with the disclosure.

FIG. 10 is a chart illustrating a trace of the internal cylinder pressure as measured against crankshaft angle for a six-stroke combustion cycle in accordance with the disclosure.

DETAILED DESCRIPTION

This disclosure generally relates to an internal combustion engine and, more particularly, to one adapted to perform a six-stroke cycle for reduced emissions and improved efficiencies. Internal combustion engines burn a hydrocarbon-based fuel or another combustible fuel to convert the potential or chemical energy therein to mechanical power. In one embodiment, the disclosed engine may be a compression ignition engine, such as a diesel engine, in which a mixture of air and fuel is compressed in a cylinder to raise the pressure and temperature of the mixture to a point of at which auto-ignition or spontaneous ignition occurs. Compression ignition engines typically lack sparkplugs, which are typically associated with cylinders of gasoline burning engines. In the present disclosure, the utilization of different fuels such as gasoline and different ignition methods, for example, use of diesel as a pilot fuel to ignite gasoline or natural gas, are contemplated and fall within the scope of the disclosure.

Figure 1:
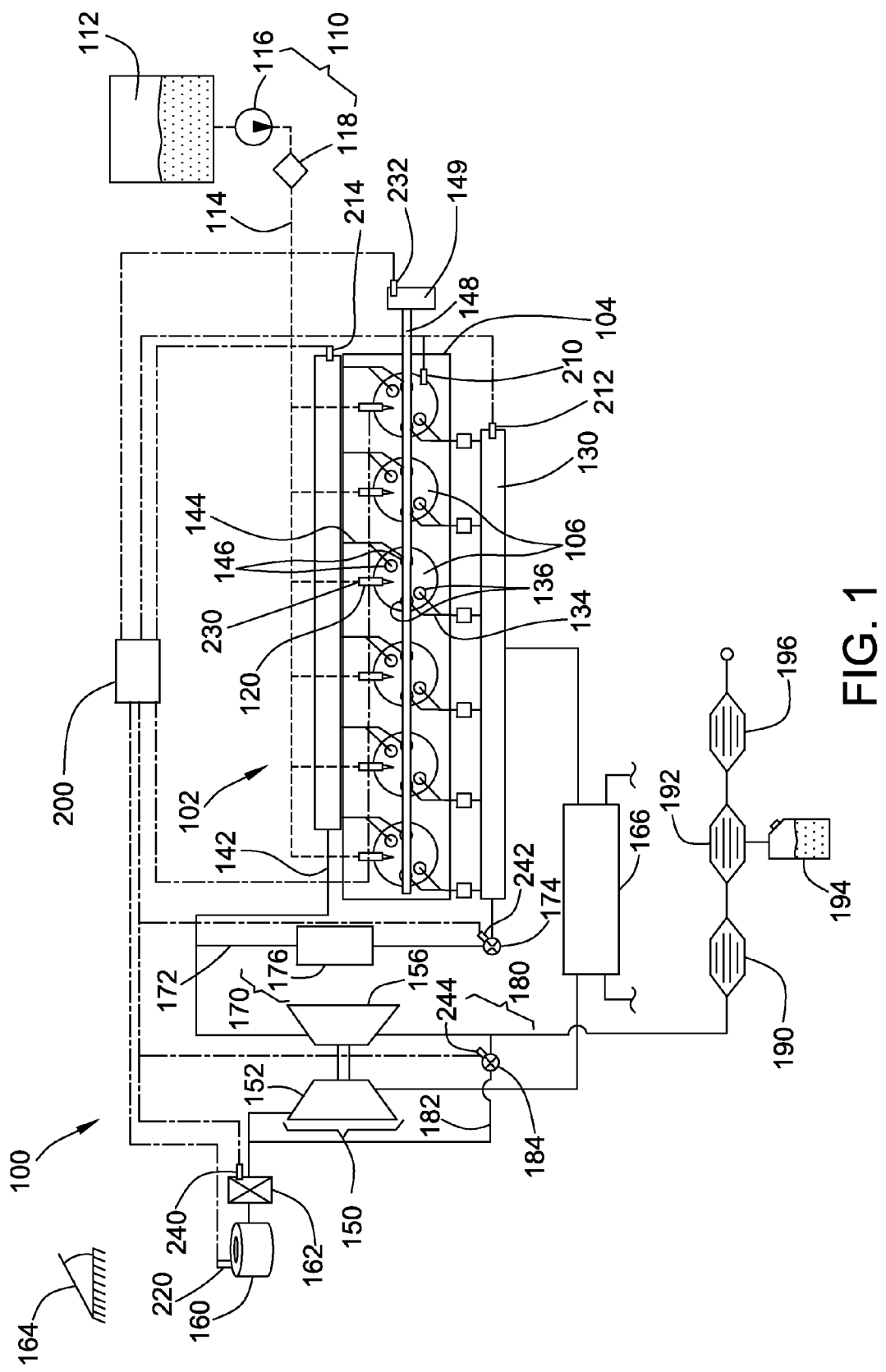
FIG. 1 is a block diagram of an engine system having an internal combustion engine adapted for operation in accordance with a six-stroke combustion cycle and associated systems and components for performing the combustion process in accordance with the disclosure.

Now referring to FIG. 1, wherein like reference numbers refer to like elements, there is illustrated a block diagram representing an internal combustion engine system 100. The engine system 100 includes an internal combustion engine 102 and, in particular, a diesel engine that combusts a mixture of air and diesel fuel. In the present description, it is contemplated that the air provided to the cylinder may be in the form of a mixture of air and exhaust gas. The illustrated internal combustion engine 102 includes an engine block 104 in which a plurality of combustion chambers 106 are disposed. Although six combustion chambers 106 are shown in an inline configuration, in other embodiments fewer or more combustion chambers may be included or another configuration such as a V-configuration may be employed. The engine system 100 can be utilized in any suitable application including mobile applications such as motor vehicles, work machines, locomotives or marine engines, and stationary applications such as electrical power generators.

To supply the fuel that the engine 102 burns during the combustion process, a fuel system 110 is operatively associated with the engine system 100. The fuel system 110 includes a fuel reservoir 112 that can accommodate a hydrocarbon-based fuel such as liquid diesel fuel. Although only one fuel reservoir is depicted in the illustrated embodiment, it will be appreciated that in other embodiments additional reservoirs may be included that accommodate the same or different types of fuels that may also be burned during the combustion process. Because the fuel reservoir 112 is often situated in a remote location with respect to the engine 102, a fuel line 114 can be disposed through the engine system 100 to direct the fuel from the fuel reservoir to the engine. To pressurize the fuel and force it through the fuel line 114, a fuel pump 116 can be disposed in the fuel line. An optional fuel conditioner 118 may also be disposed in the fuel line 114 to filter the fuel or otherwise condition the fuel by, for example, introducing additives to the fuel, heating the fuel, removing water and the like.

To introduce the fuel to the combustion chambers 106, the fuel line 114 may be in fluid communication with one or more fuel injectors 120 that are associated with the combustion chambers. In the illustrated embodiment, one fuel injector 120 is associated with each combustion chamber but in other embodiments different numbers of injectors might be included. Additionally, while the illustrated embodiment depicts the fuel line 114 terminating at the fuel injectors, the fuel line may establish a fuel loop that continuously circulates fuel through the plurality of injectors and, optionally, delivers unused fuel back to the fuel reservoir 112. The fuel injectors 120 can be electrically actuated devices that selectively introduce a measured or predetermined quantity of fuel to each combustion chamber 106. In other embodiments, introduction methods other than fuel injectors, such as a carburetor or the like, can be utilized.

To supply the air that is combusted with the fuel in the combustion chambers 106, a hollow runner or intake manifold 130 can be formed in or attached to the engine block 104 such that it extends over or proximate to each of the combustion chambers. The intake manifold 130 can communicate with an intake line 132 that directs air to the internal combustion engine 102. Fluid communication between the intake manifold 130 and the combustion chambers 106 can be established by a plurality of intake runners 134 extending from the intake manifold. One or more intake valves 136 can be associated with each combustion chamber 106 and can open and close to selectively introduce the intake air from the intake manifold 130 to the combustion chamber. While the illustrated embodiment depicts the intake valves at the top of the combustion chamber 106, in other embodiments the intake valves may be placed at other locations such as through a sidewall of the combustion chamber. To direct the exhaust gasses produced by combustion of the air/fuel mixture out of the combustion chambers 106, an exhaust manifold 140 communicating with an exhaust line 142 can also be disposed in or proximate to the engine block 104. The exhaust manifold 140 can communicate with the combustion chambers 106 by exhaust runners 144 extending from the exhaust manifold 140. The exhaust manifold 140 can receive exhaust gasses by selective opening and closing of one or more exhaust valves 146 associated with each chamber.

To actuate the intake valves 136 and the exhaust valves 146, the illustrated embodiment depicts an overhead camshaft 148 that is disposed over the engine block 104 and operatively engages the valves, but other valve activation arrangements and structures can be used. As will be familiar to those of skill in the art, the camshaft 148 can include a plurality of eccentric lobes disposed along its length that, as the camshaft rotates, cause the intake and exhaust valves 136, 146 to displace or move up and down in an alternating manner with respect to the combustion chambers 106. The placement or configuration of the lobes along the camshaft 148 controls or determines the gas flow through the internal combustion engine 102. In an embodiment, the camshaft 148 can be configured to selectively control the relative timing and the duration of the valve opening and closing events through a process referred to as variable valve timing. Various arrangements for achieving variable valve timing are known. In one embodiment, contoured lobes formed on the camshaft 148 are manipulated to alter the timing and duration of valve events by moving the camshaft along its axis to expose the valve activators to changing lobe contours. To implement these adjustments in the illustrated embodiment, the camshaft 148 can be associated with a camshaft actuator 149. As is known in the art, other methods exist for implementing variable valve timing such as additional actuators acting on the individual valve stems and the like.

To assist in directing the intake air to and exhaust gasses from the internal combustion engine 102, the engine system 100 can include a turbocharger 150. The turbocharger 150 includes a compressor 152 disposed in the intake line 132 that compresses intake air drawn from the atmosphere and directs the compressed air to the intake manifold 130. Although a single turbocharger 150 is shown, more than one such device connected in series and/or in parallel with another can be used. To power the compressor 152, a turbine 156 can be disposed in the exhaust line 142 and can receive pressurized exhaust gasses from the exhaust manifold 140. The pressurized exhaust gasses directed through the turbine 156 can rotate a turbine wheel having a series of blades thereon, which powers a shaft that causes a compressor wheel to rotate within the compressor housing.

To filter debris from intake air drawn from the atmosphere, an air filter 160 can be disposed upstream of the compressor 152. In some embodiments, the engine system 100 may be open-throttled wherein the compressor 152 draws air directly from the atmosphere with no intervening controls or adjustability. In such systems, engine speed is primarily controlled by the amount of and timing at which fuel is introduced to the combustion chambers. However, in other embodiments, to assist in controlling or governing the amount of air drawn into the engine system 100, an adjustable governor or intake throttle 162 can be disposed in the intake line 132 between the air filter 160 and the compressor 152 to provide a means of controlling the air intake of the engine, but other means, such as by use of variable valve timing, can be used for this purpose. Because the intake air may become heated during compression, an intercooler 166 such as an air-to-air heat exchanger can be disposed in the intake line 132 between the compressor 152 and the intake manifold 130 to cool the compressed air.

To reduce emissions and assist adjusted control over the combustion process, the engine system 100 can mix the intake air with a portion of the exhaust gasses drawn from the exhaust system of the engine through a system or process called exhaust gas recirculation (EGR). The EGR system forms an intake air/exhaust gas mixture that is introduced to the combustion chambers. In one aspect, addition of exhaust gasses to the intake air displaces the relative amount of oxygen in the combustion chamber during combustion that results in a lower combustion temperature and reduces the generation of nitrogen oxides. Two exemplary EGR systems are shown associated with the engine system 100 in FIG. 1, but it should be appreciated that these illustrations are exemplary and that either one, both, or neither can be used on the engine. It is contemplated that selection of an EGR system of a particular type may depend on the particular requirements of each engine application.

In the first embodiment, a high-pressure EGR system 170 operates to direct high-pressure exhaust gasses to the intake manifold 130. The high-pressure EGR system 170 includes a high-pressure EGR line 172 that communicates with the exhaust line 142 downstream of the exhaust manifold 140 and upstream of the turbine 156 to receive the high-pressure exhaust gasses being expelled from the combustion chambers 106. The system is thus referred to as a high-pressure EGR system 170 because the exhaust gasses received have yet to depressurize through the turbine 156. The high-pressure EGR line 172 is also in fluid communication with the intake manifold 130. To control the amount or quantity of the exhaust gasses combined with the intake air, the high-pressure EGR system 170 can include an adjustable EGR valve 174 disposed along the high-pressure EGR line 172. Hence, the ratio of exhaust gasses mixed with intake air can be varied during operation by adjustment of the adjustable EGR valve 174. Because the exhaust gasses may be at a sufficiently high temperature that may affect the combustion process, the high-pressure EGR system can also include an EGR cooler 176 disposed along the high-pressure EGR line 172 to cool the exhaust gasses.

In the second embodiment, a low-pressure EGR system 180 directs low-pressure exhaust gasses to the intake line 132 before it reaches the intake manifold 130. The low-pressure EGR system 180 includes a low-pressure EGR line 182 that communicates with the exhaust line 142 downstream of the turbine 156 so that it receives low-pressure exhaust gasses that have depressurized through the turbine. The low-pressure exhaust gasses are delivered to the engine intake system upstream of the compressor 152 so they can mix and be compressed with the incoming air. The system is thus referred to as a low-pressure EGR system because it operates using depressurized exhaust gasses. To control the quantity of exhaust gasses re-circulated, the low-pressure EGR line 182 can also include an adjustable EGR valve 184.

To further reduce emissions generated by the combustion process, the engine system 100 can include one or more after-treatment devices disposed along the exhaust line 142 that treat the exhaust gasses before they are discharged to the atmosphere. One example of an after-treatment device is a diesel particulate filter (DPF) 190 that can trap or capture particulate matter in the exhaust gasses. As the DPF becomes filled with particulate matter, it undergoes a process known as regeneration in which the particulate matter is oxidized. Regeneration may be done either passively or actively. Passive regeneration utilizes heat inherently produced by the engine to burn or incinerate the captured particulate matter. Active regeneration generally requires higher temperature and employs an added heat source such as a burner to heat the DPF. Another after-treatment device that may be included with the engine system is a selective catalytic reduction (SCR) system 192. In an SCR system 192, the exhaust gasses are combined with a reductant agent such as ammonia or urea and are directed through a catalyst that chemically converts or reduces the nitrogen oxides in the exhaust gasses to nitrogen and water. To provide the reductant agent, a separate storage tank 194, which is placed in fluid transfer with the SCR catalyst, may be associated with the SCR system. A diesel oxidation catalyst 196 is a similar after-treatment device that includes metals such as palladium and platinum that can act as catalysts to convert hydrocarbons and carbon monoxide in the exhaust gasses to carbon dioxide. Other types of catalytic converters, three way converters, mufflers and the like can also be included as possible after-treatment devices.

Figure 11:
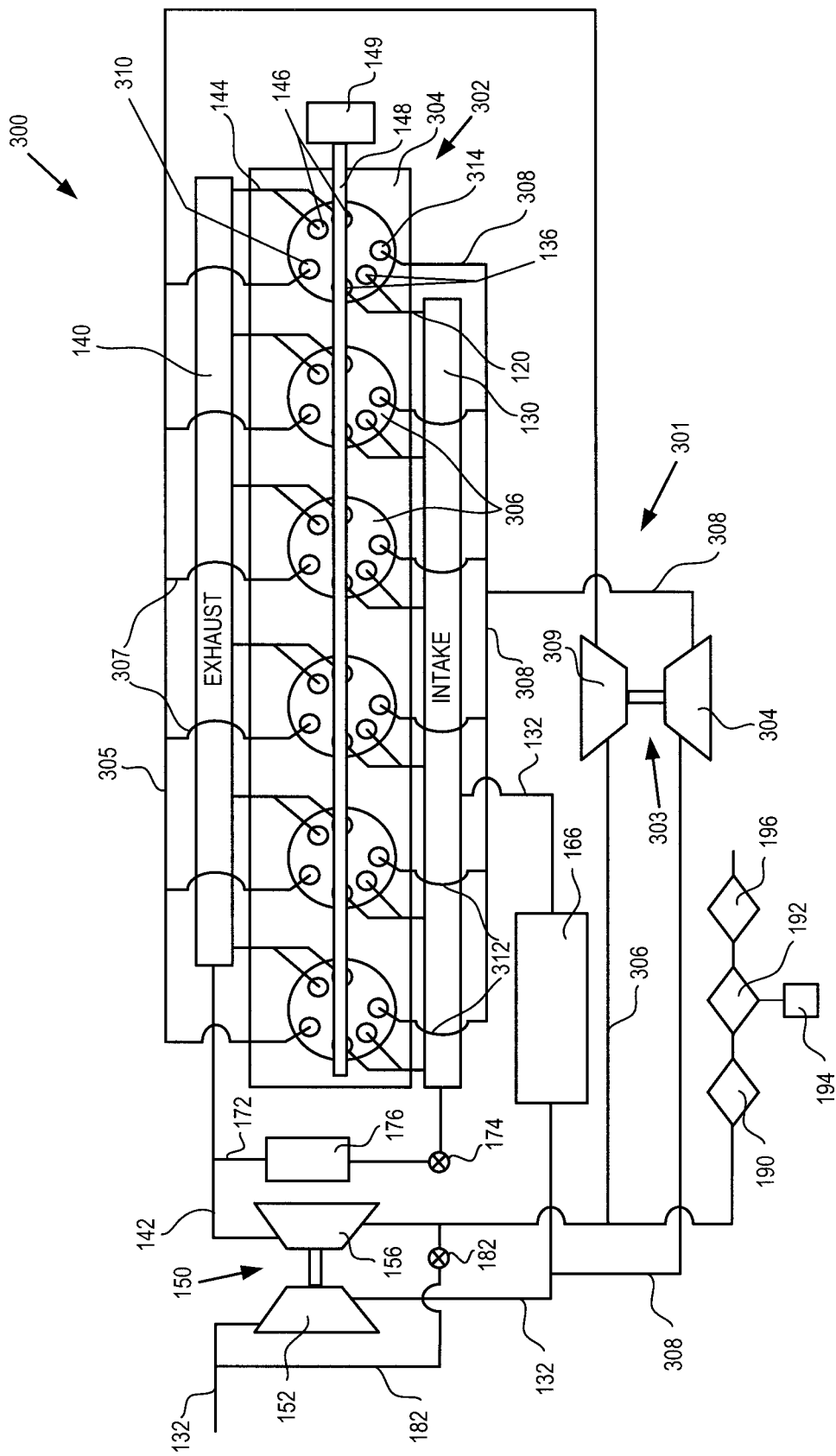
FIG. 11 is a block diagram of another embodiment of an engine system having an internal combustion engine in accordance with the disclosure.

In addition to or instead of the low- and/or high-pressure EGR systems described above, and to control the combustion process within each cylinder 106, a blowdown turbocharger system 301, as shown in FIG. 11, can be used in one embodiment. FIG. 11 illustrates an engine system 300 that includes the blowdown turbocharger system 301 to reduce emissions generated by an internal combustion engine 302 and to provide a means for more effective combustion control. In FIG. 11, various components and systems shown in FIG. 1 have been omitted for clarity but is should be appreciated that such components and systems can be part of the engine system 300, as applicable. As shown, a blowdown turbocharger 303 is disposed in parallel fluid circuit connection with respect to the combustion cylinders relative to the main turbocharger system of the engine, in this case, the turbocharger 150. In this way, two exhaust streams can be provided, each driving a respective turbine. The difference between the two streams, however, is that the blowdown turbocharger 303 is configured to only receive blowdown exhaust gas, which is a term used to refer to the exhaust gas that is removed from the engine cylinders during only the recompression stroke that is performed after the first power stroke and before the second power stroke as previously described. The turbocharger 150 receives exhaust gas expelled from the engine cylinders after completion of the second combustion stroke and, although shown as including a single turbine, may include two or more turbines arranged in series connection, parallel connection, or any other known turbine arrangement.

The illustrated blowdown turbocharger system 301 includes a blowdown turbocharger 303 with a blowdown turbine 309 that drives a blowdown compressor 304. The blowdown turbocharger system 301 also includes a blowdown exhaust line 305 separate from the exhaust line 142, and a blowdown compressor line 308. In embodiments that include a blowdown turbocharger system 301, fluid communication between the combustion chambers 306 and the blowdown exhaust line 305 can be established by blowdown exhaust runners 307 extending from the blowdown exhaust line 305. As shown, the blowdown exhaust runners 307 are formed separate from the exhaust runners 144, which interconnect the combustion chamber 306 with the exhaust manifold 140.

One or more blowdown exhaust valves 310 can be associated with each combustion chamber 306 and can open and close to selectively expel blowdown exhaust gasses from the combustion chamber to the blowdown exhaust line 305. The blowdown exhaust line 305 directs the blowdown exhaust gasses through the blowdown turbine 309 and into the exhaust line 142, where they are mixed with the normal engine exhaust stream. Also in embodiments that include a blowdown turbocharger system 301, fluid communication between the combustion chamber 306 and the blowdown compressor line 308 can be established by blowdown compressor intake runners 312, which extend from the blowdown compressor line 308 and which are formed separately from the intake runners 120 that interconnect the combustion chamber 306 with the intake manifold 130. One or more blowdown compressor intake valves 314 can be associated with each combustion chamber 306 and can open and close to selectively introduce air from the blowdown compressor line 308 into the combustion chamber.

Referring again to FIG. 1, to coordinate and control the various systems and components associated with the engine system 100, the system can include an electronic or computerized control unit, module or controller 200. The controller 200 is adapted to monitor various operating parameters and to responsively regulate various variables and functions affecting engine operation. The controller 200 can include a microprocessor, an application specific integrated circuit ("ASIC"), or other appropriate circuitry and can have memory or other data storage capabilities. The controller can include functions, steps, routines, data tables, data maps, charts and the like saved in and executable from electronic memory means that are readable and writable to control the engine system.

Although in FIG. 1, the controller 200 is illustrated as a single, discrete unit, in other embodiments, the controller and its functions may be distributed among a plurality of distinct and separate components. To receive operating parameters and send control commands or instructions, the controller can be operatively associated with and can communicate with various sensors and controls on the engine system 100. Communication between the controller and the sensors can be established by sending and receiving digital or analog signals across electronic communication lines or communication busses. In FIG. 1, the various communication and command channels are indicated in dashed lines for illustration purposes.

For example, to monitor the pressure and/or temperature in the combustion chambers 106, the controller 200 may communicate with chamber sensors 210 such as a transducer or the like, one of which may be associated with each combustion chamber 106 in the engine block 104. The chamber sensors 210 can monitor the combustion chamber conditions directly or indirectly, for example, by measuring the backpressure exerted against the intake or exhaust valves, or other components that directly or indirectly communicate with the combustion cylinder such as glow plugs. During combustion, the chamber sensors 210 and the controller 200 can indirectly measure the pressure in the combustion chamber 106. The controller can also communicate with an intake manifold sensor 212 disposed in the intake manifold 130 and that can sense or measure the conditions therein. To monitor the conditions such as pressure and/or temperature in the exhaust manifold 140, the controller 200 can similarly communicate with an exhaust manifold sensor 214 disposed in the exhaust manifold 140. From the temperature of the exhaust gasses in the exhaust manifold 140, the controller 200 may be able to infer the temperature at which combustion in the combustion chambers 106 is occurring.

To measure the flow rate, pressure and/or temperature of the air entering the engine, the controller 200 can communicate with an intake air sensor 220. The intake air sensor 220 may be associated with, as shown, the intake air filter 160 or another intake system component such as the intake manifold. The intake air sensor 220 may also determined or sense the barometric pressure or other environmental conditions in which the engine system is operating.

For controlling the combustion process, the controller 200 can communicate with injector controls 230 that can control the fuel injectors 120 operatively associated with the combustion chambers 106. The injector controls 230 can selectively activate or deactivate the fuel injectors 120 to determine the timing of introduction and the quantity of fuel introduced by each fuel injector, for example, by further monitoring and control of the injection pressure of fuel provided to the fuel injectors 120. Regarding control of valve timing, the controller 200 can also communicate with a camshaft control 232 that is operatively associated with the camshaft 148 and/or camshaft actuator 149 to control the variable valve timing, when such a capability is used.

In embodiments having an intake throttle 162, the controller 200 can communicate with a throttle control 240 associated with the throttle and that can control the amount of air drawn into the engine system 100. Alternatively, the amount of air used by the engine may be controlled by variably controlling the intake valves in accordance with a Miller cycle, which includes maintaining intake valves open for a period during the compression stroke and/or closing intake valves early during an intake stroke to thus reduce the amount of air compressed in the cylinder during operation. The controller 200 can also be operatively associated with either or both of the high-pressure EGR system 170 and/or the low-pressure EGR system 180. For example, the controller 200 is communicatively linked to a high-pressure EGR control 242 associated with the adjustable EGR valve 174 disposed in the high-pressure EGR line 182. Similarly, the controller 220 can also be communicatively linked to a low-pressure EGR control 244 associated with the adjustable EGR valve 184 in the low-pressure EGR line 182. The controller 220 can thereby adjust the amount of exhaust gasses and the ratio of intake air/exhaust gasses introduced to the combustion process.

The engine system 100 can operate in accordance with a six-stroke combustion cycle in which the reciprocal piston disposed in the combustion chamber makes six or more strokes between the top dead center (TDC) position and bottom dead center (BDC) position during each cycle. A representative series of six strokes and the accompanying operations of the engine components associated with the combustion chamber 106 are illustrated in FIGS. 2-8 and the valve lift and related cylinder pressure are charted with respect to crank angle in FIGS. 9 and 10. Additional strokes, for example, 8-stroke or 10-stroke operation and the like, which would include one or more successive recompressions, are not discussed in detail herein as they would be similar to the recompression and recombustion that is discussed, but are contemplated to be within the scope of the disclosure.

The strokes are performed by a reciprocal piston 250 that is slidably disposed in an elongated cylinder 252 bored into the engine block. One end of the cylinder 252 is closed off by a flame deck surface 254 so that the combustion chamber 106 defines an enclosed space between the piston 250, the flame deck surface and the inner wall of the cylinder. The reciprocal piston 250 moves between the TDC position where the piston is closest to the flame deck surface 254 and the BDC position where the piston is furthest from the flame deck surface. The motion of the piston 250 with respect to the flame deck surface 254 thereby defines a variable volume 258 that expands and contracts.

Referring to FIG. 2, the six-stroke cycle starts with an intake stroke during which the piston 250 moves from the TDC position to the BDC position causing the variable volume 258 to expand. During this stroke, the intake valve 136 is opened so that air or an air/fuel mixture may be directed into the combustion chamber 106, as represented by the exemplary positive bell-shaped intake curve 270 indicating intake valve lift in FIG. 9. The duration of the intake valve opening and the shape of the intake curve 270 may optionally be adjusted to control the amount of air provided to the cylinder. Referring to FIG. 3, once the piston 250 reaches the BDC position, the intake valve 136 closes and the piston can perform a first compression stroke moving back toward the TCD position and compressing the variable volume 258 that has been filled with air during the intake stroke. As indicated by the upward slope of the first compression curve 280 in FIG. 10, this motion increases pressure and relatedly temperature in the combustion chamber. In diesel engines, the compression ratio can be on the order of 15:1 although other compression ratios are common.

As illustrated in FIG. 4, in those embodiments in which air or a mixture of air with exhaust gas is initially drawn into the combustion chamber 106, the fuel injector 120 can introduce a first fuel charge 260 into the variable volume 258 to create an air/fuel mixture as the piston 250 approaches the TDC position. The quantity of the first fuel charge 260 can be such that the resulting air/fuel mixture is lean, meaning there is an excess amount of oxygen to the quantity of fuel intended to be combusted. At an instance when the piston 250 is at or close to the TDC position and the pressure and temperature are at or near a first maximum pressure, as indicated by point 282 in FIG. 10, the air/fuel mixture may ignite. In embodiments where the fuel is less reactive, such as in gasoline burning engines, ignition may be induced by a sparkplug, by ignition of a pilot fuel or the like. During a first power stroke, the combusting air/fuel mixture expands forcing the piston 250 back to the BDC position as indicated in FIGS. 4 to 5. The piston 250 can be linked or connected to a crankshaft 256 so that its linear motion is converted to rotational motion that can be used to power an application or machine. The expansion of the variable volume 258 during the first power stroke also reduces the pressure in the combustion chamber 106 as indicated by the downward sloping first expansion curve 284 in FIG. 10. At this stage, the variable volume contains the resulting combustion products 262 that may include unburned fuel, soot, ash and excess oxygen from the intake air.

Referring to FIG. 6, in the six-stroke cycle, the piston 250 can perform another compression stroke in which it compresses the combustion products 262 in the variable volume 258 by moving back to the TDC position. During the second compression stroke, both the intake valve 136 and exhaust valve 146 are typically closed so that pressure increases in the variable volume as indicate by the second compression curve 286 in FIG. 10. However, in some embodiments, to prevent too large a pressure spike, the exhaust valve 146 may be briefly opened to discharge some of the contents as blowdown exhaust gasses in a process referred to as blowdown, as indicated by the small blowdown curve 272 in FIG. 9.

Figure 12:
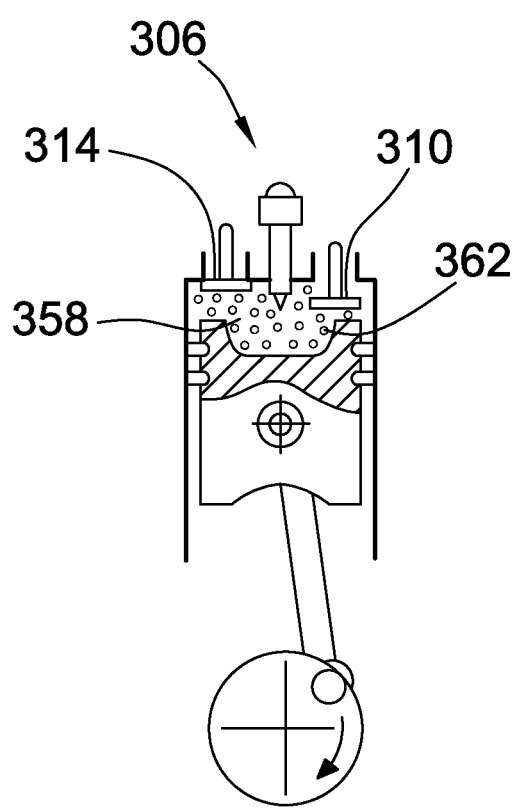
FIGS. 12-13 are cross-sectional views representing an engine cylinder and a piston movably disposed therein at various points during a six-stroke combustion cycle in accordance with the disclosure.

Alternatively, FIG. 12 illustrates an embodiment of a combustion chamber 306 of an engine 302 during the second compression stroke in an engine system 300 featuring a blowdown turbocharger system 301 such as the engine system illustrated in FIG. 11. As shown in FIG. 12, the blowdown exhaust valve 310, rather than the main exhaust valves 146, may briefly open during the second compression stroke to discharge some of the combustion products 362 out of the variable volume 358 as blowdown exhaust gasses. The blowdown exhaust gasses can be directed into the blowdown exhaust line 305 through the blowdown exhaust runners 307. The blowdown exhaust line 305 directs the blowdown exhaust gasses through the blowdown turbine 309, and then into the exhaust line 142 downstream of the turbine 156. As the blowdown exhaust gasses pass through the blowdown turbine 309, the gasses can drive the blowdown turbine 309, which drives the blowdown compressor 304. The blowdown compressor line 308 can direct air from the intake line 132 into the blowdown compressor 304. When the blowdown compressor line 308 intersects the intake line 132 downstream of the compressor 156, as shown in the embodiment illustrated in FIG. 11, the air directed into the blowdown compressor 304 has already been compressed by the compressor. The blowdown compressor 304 can super-compress the air in the blowdown compressor line 308, which can then be directed through the blowdown compressor intake runners 312 and into the engine 302.

Figure 13:
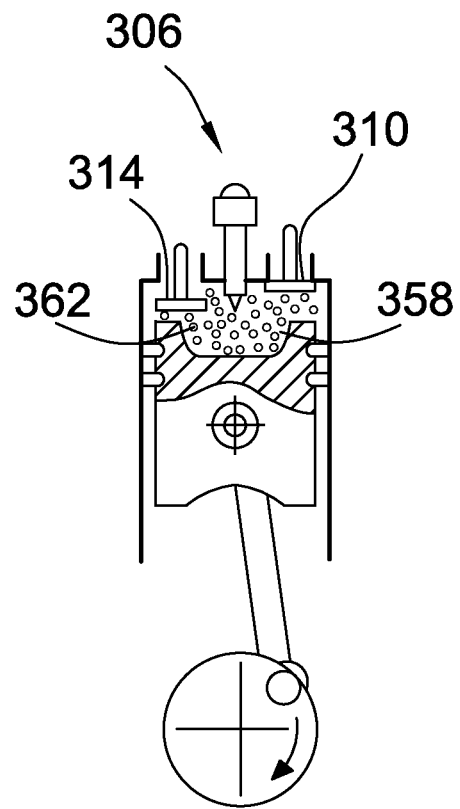

As shown in FIG. 13, the blowdown compressor intake valve 314 can briefly open during the second compression stroke either before, after, or in conjunction with the opening of the blowdown exhaust valve 310 to introduce super-compressed air into the variable volume 358 from the blowdown compressor line 308. The super-compressed air is pushed into the variable volume 358 if the super-compressed air is at a higher pressure than the combustion products 362 within the variable volume. The specific timing for selectively opening and closing the blowdown exhaust valve 310 and the blowdown compressor intake valve 314 can be achieved with variable valve timing or extended valve actuation, as both techniques are known in the art. Such selective valve activation may be adjusted based on engine operating parameters that are indicative of or serve as a basis for calculating the amount of exhaust gas that will thus be expelled from the cylinders. Exemplary engine parameters that are suitable for such determination can include, but not be limited to, cylinder pressure, exhaust temperature, exhaust gas pressure in the exhaust manifold, blowdown valve timing and duration, and others.

When the piston 250 reaches the TDC position shown in FIG. 6, the fuel injector 120 can introduce a second fuel charge 264 into the combustion chamber 106 that can intermix with the combustion products 262 from the previous combustion event. Referring to FIG. 10, at this instance, the pressure in the compressed variable volume 258 will be at a second maximum pressure 288. The second maximum pressure 288 may be greater than the first maximum pressure 282 or may be otherwise controlled to be about the same or lower than the first pressure.

The quantity of the second fuel charge 264 introduced to the cylinder, in conjunction with oxygen that may remain within the cylinder, can be selected such that stoichiometric or near stoichiometric conditions for combustion are provided within the combustion chamber 106. At stoichiometric conditions, the ratio of fuel to air is such that substantially the entire second fuel charge will react with all the remaining oxygen in the combustion products 262. When the piston 250 is at or near the TDC position and combustion chamber 106 reaches the second maximum pressure 288, the second fuel charge 264 and the previous combustion products 262 may spontaneously ignite. Referring to FIGS. 6 to 7, the second ignition and resulting second combustion expands the contents of the variable volume 258 forcing the piston toward the BDC position resulting in a second power stroke driving the crankshaft 256. The second power stroke also reduces the pressure in the cylinder 252 as indicated by the downward slopping second expansion curve 290 in FIG. 10.

The second combustion event can further incinerate the unburned combustion products from the initial combustion event such as unburned fuel and soot. The quantity or amount of hydrocarbons in the resulting second combustion products 266 remaining in the cylinder 252 may also be reduced. Referring to FIG. 8, an exhaust stroke can be performed during which the momentum of the crankshaft 256 moves the piston 250 back to the TDC position with the exhaust valve 146 opened to discharge the second combustion products to the exhaust system. Alternatively, additional recompression and re-combustion strokes can be performed. With the exhaust valve opened as indicated by the bell-shaped exhaust curve 274 in FIG. 9, the pressure in the cylinder can return to its initial pressure as indicated by the low, flat exhaust curve 292 in FIG. 10.

Figure 14:
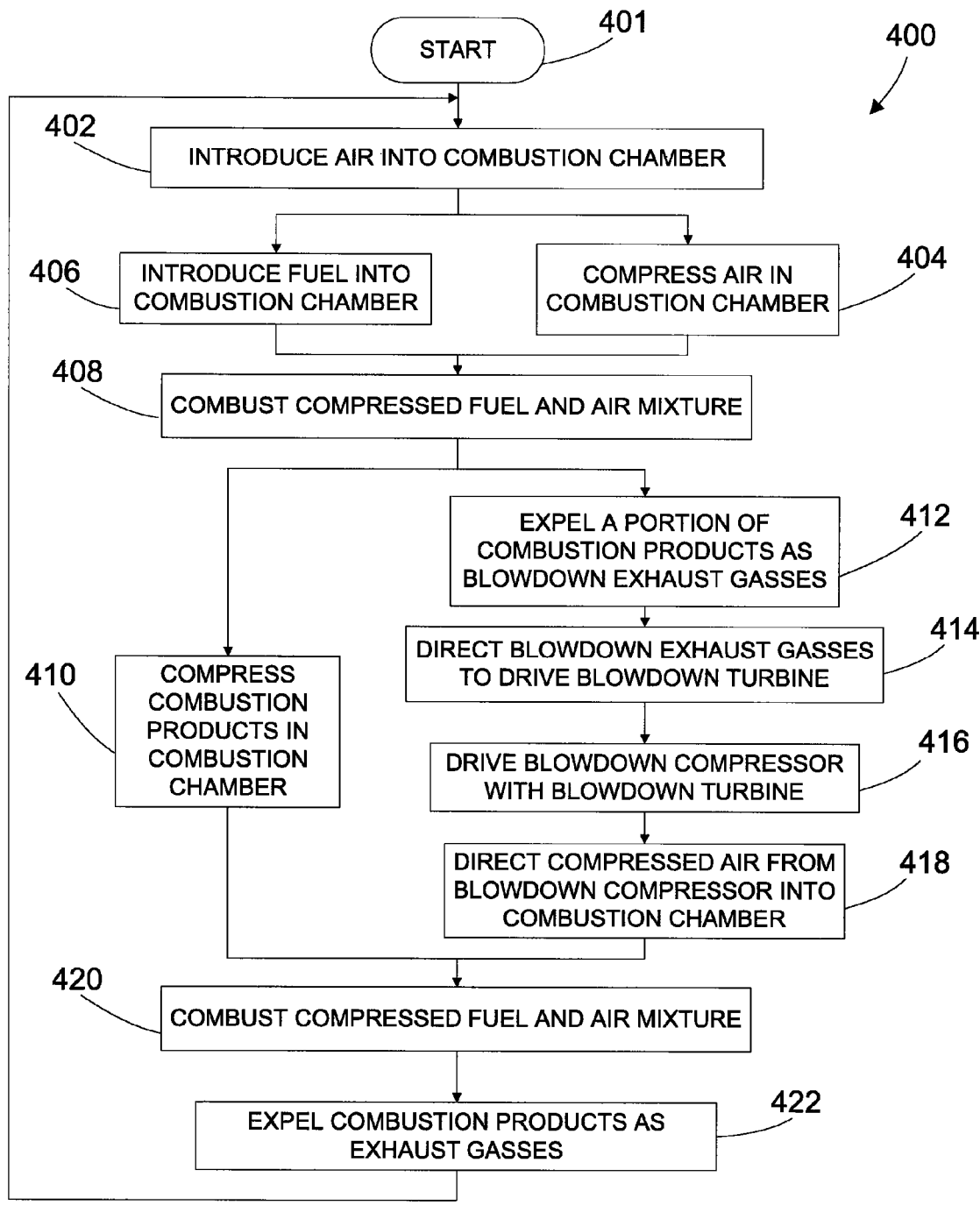
FIG. 14 is a flowchart depicting a method of operating an engine system having an internal combustion engine in accordance with the disclosure.

FIG. 14 illustrates a representative flowchart of a method 400 of operating and engine system 300 featuring a blowdown turbocharger system 301. After starting at 401, the method includes opening the intake valves 136 during an intake stroke to introduce air into the combustion chamber 306 at 402. The intake valves 136 close after the piston has reached the BDC position to seal the combustion chamber such that the first compression stroke compresses the air trapped in the combustion chamber 306 at 404. At some point during the first compression stroke, fuel can be introduced into the combustion chamber 306 to create a air/fuel mixture at 406. At a time near the time when the piston 350 reaches the TDC position, the air/fuel mixture may ignite and combust at 408, expanding against the piston during a first power stroke and forcing the piston back to the BDC position. In a second compression stroke, the piston 350 can compress the combustion products 362 in the combustion chamber 306 at 410. During the second compression stroke, the blowdown exhaust valve 310 can open to expel a portion of the combustion products 362 as blowdown exhaust gasses at 412. The blowdown exhaust gas is directed through the blowdown exhaust line 305 to drive the blowdown turbine 309 at 414, and the blowdown turbine drives the blowdown compressor 304 at 416. The blowdown compressor 304 compresses or super-compresses air in the blowdown compressor line 308, which is directed into the engine 302 at 418. The blowdown compressor intake valve 114 can open to allow the compressed or super-compressed air from the blowdown compressor 304 into the combustion chamber 306. Once the piston 350 reaches the TDC position, additional fuel can be introduced into the combustion chamber 306 to mix with the remaining combustion products 362. The compressed air/fuel/combustion product mixture combusts at 420, forcing the piston 350 towards the BDC position during a second power stroke. During the exhaust stroke, the exhaust valves 146 open expelling the combustion products 362 from the combustion chamber 306 as exhaust gasses at 422.

INDUSTRIAL APPLICABILITY

The industrial application for the apparatus and methods of a six-stroke engine system with blowdown exhaust system as described herein should be readily appreciated from the foregoing discussion. The present disclosure is applicable to any type of machine utilizing an internal combustion engine performing a six-stroke combustion cycle. It may be particularly useful in increasing efficiency of machines with six-stroke internal combustion engines.

Utilizing the apparatus taught in this disclosure can increase the efficiency of the engine 302 by reducing the pressure in the engine's combustion chambers during the second compression stroke of the piston. Referring to FIGS. 12 and 13, expelling a portion of the combustion products 362 from the variable volume 358 through the blowdown exhaust valves 310 after the first power stroke can reduce the volume or amount of material remaining within the variable volume for the piston 350 to compress during the second compression stroke. Reducing the combustion products remaining in the variable volume 358 results in less force required to compress that material. The engine 302, thus, may work more efficiently, i.e., a larger percentage of engine power generated can be used to perform work rather than being consumed to operate the engine, when a portion of the combustion products 362 are expelled from the variable volume as blowdown exhaust gasses after the first power stroke. This is because the engine can use less energy to compress the combustion products remaining in the variable volume 358. The relationship between efficiency and the amount of blowdown gasses expelled is generally inversely related such that expelling large amounts of combustion products 362 from the variable volume 358 results in relatively greater efficiency, while expelling small amounts of or no combustion products results in relatively lower increased efficiency. Another benefit of reducing the amount of material to compress within the variable volume 358 is reduction of the peak cylinder pressure experienced in the combustion chamber 306 during the second compression stroke and the resulting forces applied to the engine 302 components such as the piston 350, the cylinder 352, and other components.

A tradeoff exists, however, between the increased efficiency of the engine 302 and the amount of emissions produced by the engine. When large amounts of combustion products 362 are expelled as blowdown exhaust gasses, engine emissions may be increased. This is because the blowdown gas may contain a higher concentration of soot and un-oxidized fuel, among other compounds, than exhaust gas that is expelled after the second combustion. Thus, a trade-off between engine efficiency and emissions should be optimized, as set forth herein.

Along these lines, the blowdown turbocharger system 301 disclosed herein can help strike a balance between maximizing engine 302 efficiency and minimizing emissions produced by the engine. As disclosed herein, the blowdown exhaust gasses expelled from the combustion chamber 306 are used to drive a blowdown turbine 309, which drives a blowdown compressor 304. The blowdown compressor 304 super-compresses air entering the system through the intake line 132, and can drive super-compressed air into the combustion chamber 358 through the blowdown compressor intake valve 314. The super-compressed air can be introduced into the combustion chamber 306 when the blowdown compressor intake valve 312 opens during the second compression stroke because the super-compressed air can be arranged to be more highly pressurized than the combustion products 362 within the variable volume 358 at that time. By admitting oxygen into the cylinder in this fashion, the second compression stroke can be carried out more efficiently than would otherwise be possible without the blowdown turbocharger system 301. The additional oxygen present in the variable volume 358 can create a leaner fuel/air mixture, which can result in more left-over fuel remaining in the cylinder after the first combustion being consumed during the second power stroke. Because more fuel is burned when more oxygen is present in the combustion chamber 306, the combustion products 362 remaining in the combustion chamber for expulsion during the exhaust stroke will contain less soot and less unburned hydrocarbons.

Depending on operating conditions, however, it may be desirable to have more or less oxygen present in the combustion chamber 306 during the second power stroke. For example, although additional oxygen present in the combustion chamber 306 can result in lower emissions when the engine is operating at high load conditions, the additional oxygen may also cause higher temperatures and higher peak cylinder pressures within the combustion chamber. As discussed above, high peak cylinder pressures can damage the mechanical components of the engine 302. On the other hand, as also discussed above, the peak cylinder pressure within the combustion chamber 306 can be reduced by expelling combustion products 362 out of variable volume 358 during the second compression stroke.

Figure 15:
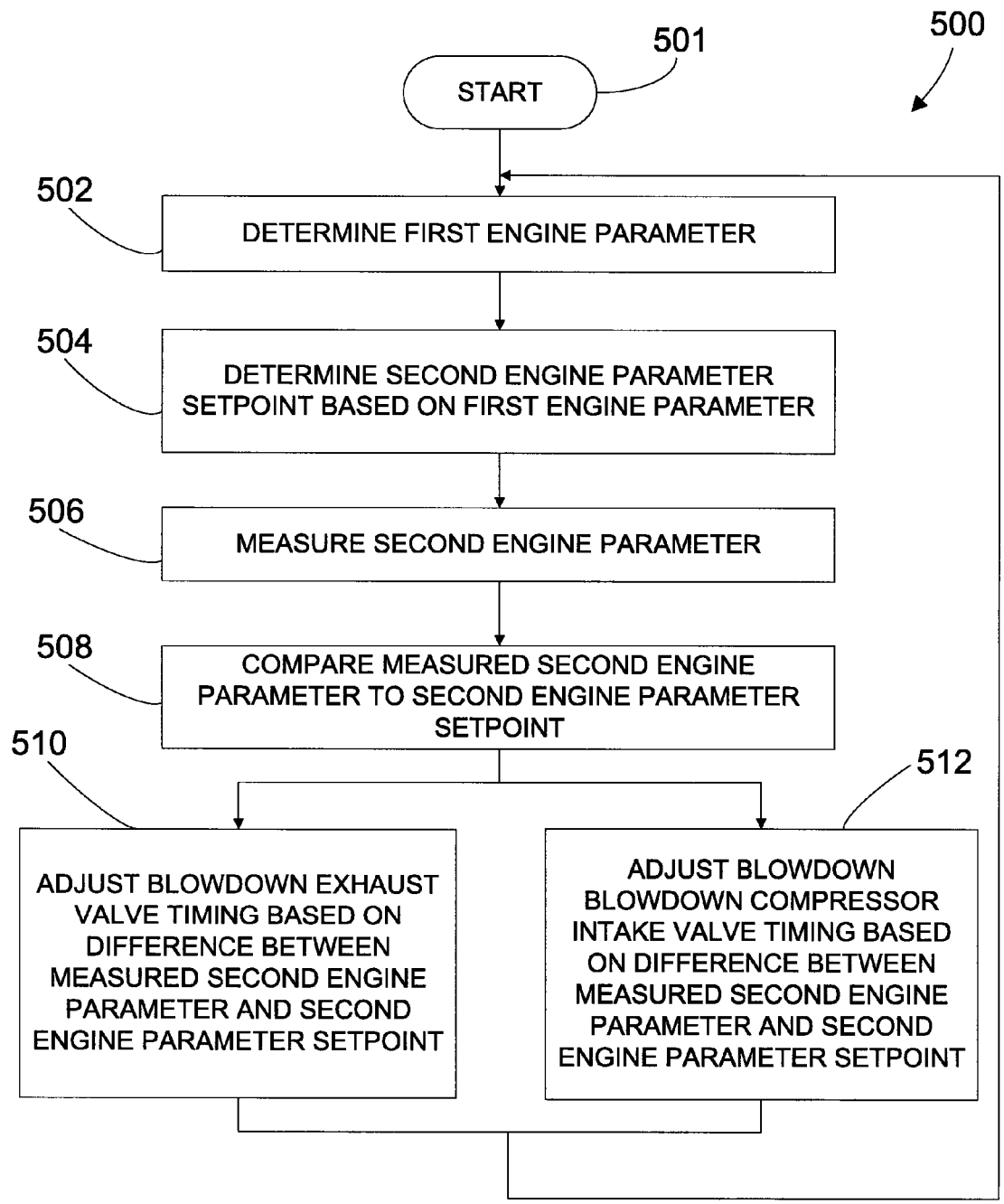
FIG. 15 is a flowchart depicting a method of controlling the operation of an engine system having an internal combustion engine in accordance with the disclosure.

FIG. 15 illustrates a representative flowchart of a method 500 of controlling the engine system to optimize the conditions in the combustion chamber 306 for a given engine system 300 operating state. The method includes configuring a controller, such as controller 200, to monitor engine system parameters and to actuate the blowdown compressor intake valve 312 and the blowdown exhaust valve 310 based on those engine system parameters. In the illustrated method, after starting at 501, the controller 200 measures or otherwise determines a first engine parameter at 502, such as engine load, engine speed, and/or any other suitable parameter. The first engine parameter may be a set of parameters, for example, engine speed and engine load, that are indicative of an engine operating point.

Based on the first engine parameter, the controller 200 determines a second engine parameter setpoint at 504. The second engine parameter setpoint can be a target value for exhaust temperature, blowdown exhaust temperature, peak cylinder pressure, air temperature, or any other parameter indicative of engine behavior and that corresponds with the first engine parameter. The illustrated method also includes sensing or otherwise measuring a second engine parameter at 506. The controller 200 can then compare the second engine parameter setpoint to the measured second engine parameter at 508. Based on the difference between the second engine parameter setpoint and the measured second engine parameter, the controller 200 can adjust the timing of the blowdown exhaust valve 310 at 510 and the timing of the blowdown compressor intake valve 312 at 512 in a manner calculated to affect a change in the second engine parameter and bring it closer to the second engine parameter setpoint for the determined first engine parameter. The controller 200 can optimize the combustion conditions within the combustion chamber 306 based on pre-determined optimization protocols based on the first engine parameter or other engine system parameters.

By way of example, in certain embodiments, the first engine parameter can be the engine operating point as defined by an engine speed and load, and the second engine parameter can be the peak cylinder pressure. In such embodiments, the controller 200 determines the engine operating point, then determines a peak cylinder pressure setpoint based on the engine operating point. The peak cylinder pressure setpoint is a pre-determined target peak cylinder pressure for the particular engine operating point. Through sensors or other known means of acquiring the peak cylinder pressure, the controller 200 takes a measurement of the actual peak cylinder pressure. The controller 200 then compares the measured peak cylinder pressure to the peak cylinder pressure setpoint and adjusts the blowdown exhaust valve 310 and/or the blowdown compressor intake valve 312 to bring the actual peak cylinder pressure to a value nearer to the value of the peak cylinder pressure setpoint.

One way to change the peak cylinder pressure is to vary the timing and/or duration for which the blowdown exhaust valve 310 remains open during the second compression stroke. Generally, the longer the blowdown exhaust valve 310 remains open during the second compression stroke, the lower the peak cylinder pressure will be during the second power stroke. The peak cylinder pressure in this context will be lower because more combustion products 362 are expelled out of the variable volume 358 the longer the blowdown exhaust valve 310 remains open. Thus, when the measured peak cylinder pressure is greater than the peak cylinder pressure setpoint, the controller 200 may command the blowdown exhaust valve 310 to remain open for a longer period of time to expel more combustion products 362 and decrease the peak cylinder pressure.

Conversely, when the measured peak cylinder pressure is less than the peak cylinder pressure setpoint, the controller 200 can control the blowdown exhaust valve 310 to remain open for a shorter period of time to expel fewer combustion products 362 and increase the peak cylinder pressure.

Another way to change the peak cylinder pressure is to vary the time for which the blowdown compressor intake valve 312 is open during the second compression stroke. Generally, the longer the blowdown compressor intake valve 312 remains open during the second compression stroke, the higher the peak cylinder pressure may become during the second power stroke. In this context, peak cylinder pressure may increase due to more super-compressed air being introduced into the combustion chamber 358. Thus, when the measured value of the peak cylinder pressure is greater than the peak cylinder pressure setpoint value, the controller 200 can control the blowdown compressor intake valve 312 to remain open for a shorter period of time to allow the introduction of less super-compressed air and decrease the peak cylinder pressure and/or, based on the above discussion, shorten the duration of valve opening for the blowdown exhaust valve 310. Conversely, if the value of the measured peak cylinder pressure is less than the peak cylinder pressure setpoint value, the controller 200 can control the blowdown compressor intake valve 312 to remain open for a longer period of time and increase the peak cylinder pressure.

The illustrated method can be repeated for as long as the engine 302 is operating or for a selected range of engine parameters calculated to optimize efficiency and emissions, as well as to ensure that the engine components operate reasonably within pre-determined mechanical stress levels.

The apparatus and methods described herein can be adapted to a large variety of machines. For example, various types of industrial machines, such as off-highway trucks, backhoe loaders, compactors, feller bunchers, forest machines, industrial loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine system operating on a six-stroke cycle comprising:
    an engine including a combustion chamber including a piston reciprocally disposed in a cylinder to move between a top dead center position and a bottom dead center position, the combustion chamber further including:
        an exhaust valve adapted to open and close to selectively expel exhaust gasses from the combustion chamber during an exhaust stroke;
        a blowdown exhaust valve adapted to open and close to selectively expel blowdown exhaust gasses from the combustion chamber during a recompression stroke;
        an intake valve adapted to open and close to selectively introduce air into the combustion chamber during an intake stroke; and
        a blowdown compressor intake valve adapted to selectively open and close to introduce air into the combustion chamber;
    an exhaust line communicating with the engine and a turbine, the exhaust line directing the exhaust gasses expelled from the exhaust valve to drive the turbine;
    a compressor adapted to be driven by the turbine;
    an intake line communicating with the engine and the compressor, the intake line:
        receiving compressed air from the compressor; and directing a portion of the compressed air into the combustion chamber through the intake valve;
a blowdown exhaust line communicating with the engine and a blowdown turbine, the blowdown exhaust line directing blowdown exhaust gasses expelled from the blowdown exhaust valve to drive the blowdown turbine, the blowdown exhaust line being separate from the exhaust line connected to an inlet of the turbine;
a blowdown compressor adapted to be driven by the blowdown turbine; and
a blowdown compressor line communicating with the engine, the blowdown compressor, and the intake line downstream of the compressor, the blowdown compressor line:
directing a portion of the compressed air from the intake line into the blowdown compressor; and
directing super-compressed air from the blowdown compressor into the engine through the blowdown compressor intake valve;
wherein the super-compressed air is introduced through the blowdown compressor intake valve into the combustion chamber during the recompression stroke.

2. The internal combustion engine of claim 1, wherein the blowdown turbine and the turbine are driven in parallel.

3. The internal combustion engine of claim 1, further comprising a high-pressure EGR line fluidly communicating with the exhaust line and the intake line, wherein the high-pressure EGR line is adapted to direct at least a portion of the exhaust gasses from the exhaust line to the intake line.

4. The internal combustion engine of claim 1, further comprising a controller configured to:
receive a signal indicative of a first engine parameter;
determine a second engine parameter setpoint based on the first engine parameter;
receive a signal indicative of a second engine parameter; and
compare the second engine parameter setpoint to the second engine parameter.

5. The internal combustion engine of claim 4, wherein the controller is further configured to adjust a time duration that the blowdown exhaust valve remains open using a difference between the second engine parameter setpoint and the second engine parameter as a primary control parameter.

6. The internal combustion engine of claim 4, wherein the controller is further configured to adjust a time duration that the blowdown compressor intake valve remains open based on the difference between the second engine parameter setpoint and the second engine parameter.

7. A method of reducing emissions from an internal combustion engine operating a six-stroke cycle, the method comprising:
opening an intake valve to introduce air into a combustion chamber of the internal combustion engine during an intake stroke;
closing the intake valve to halt the intake of air into the combustion chamber between commencement and completion of the intake stroke;
compressing the air in the combustion chamber during a first compression stroke;
introducing a first fuel charge into the combustion chamber during the first compression stroke to form a compressed fuel and air mixture;
combusting the compressed fuel and air mixture in the combustion chamber at the completion of the first compression stroke, thereby expanding the fuel and air mixture during a first power stroke and resulting in intermediate combustion products within the combustion chamber;
compressing at least part of the intermediate combustion products within the combustion chamber during a second compression stroke;
opening a blowdown exhaust valve to expel at least a portion of the intermediate combustion products as blowdown exhaust gasses from the combustion chamber between commencement of the first power stroke and completion of the second compression stroke;
using the blowdown exhaust gasses to drive a blowdown turbine;
driving a blowdown compressor with the blowdown turbine;
opening a blowdown compressor intake valve to introduce super-compressed air from the blowdown compressor into the combustion chamber during the second compression stroke;
closing the blowdown exhaust valve to halt expulsion of blowdown exhaust gasses from the combustion chamber between commencement of the first power stroke and completion of the second compression stroke;
closing the blowdown compressor intake valve to halt the introduction of super-compressed air into the combustion chamber between commencement of the first power stroke and completion of the second compression stroke;
combusting the compressed fuel and air mixture in the combustion chamber at the completion of the second compression stroke, thereby expanding the fuel and air mixture during a second power stroke and resulting in second combustion products within the combustion chamber;
opening an exhaust valve to expel at least a portion of the second combustion products from the combustion chamber as exhaust gasses;
directing the exhaust gasses to drive a turbine;
driving a compressor with the turbine; and
directing compressed air from the compressor to the blowdown compressor.

8. The method of claim 7, further comprising:
determining a first engine parameter;
determining a second engine parameter setpoint based on the first engine parameter;
measuring a second engine parameter;
comparing the second engine parameter setpoint to the second engine parameter;
adjusting a time duration that the blowdown exhaust valve remains open using a difference between the second engine parameter setpoint and the second engine parameter as a primary control parameter; and
adjusting a time duration that the blowdown compressor intake valve remains open based on the difference between the second engine parameter setpoint and the second engine parameter.

9. The method of claim 8, wherein the first engine parameter is engine speed.

10. The method of claim 8, wherein the first engine parameter is engine load.

11. The method of claim 8, wherein the second engine parameter is combustion chamber pressure.

12. The method of claim 8, wherein the second engine parameter is exhaust temperature.

13. The method of claim 8, wherein the second engine parameter is exhaust gas pressure in an exhaust manifold.

14. A machine that includes an engine, the engine comprising:
- a combustion chamber including a piston reciprocally disposed in a cylinder to move between a top dead center position and a bottom dead center position, the combustion chamber further including:
  - an exhaust valve adapted to open and close to selectively expel exhaust gasses from the combustion chamber during an exhaust stroke;
  - a blowdown exhaust valve adapted to open and close to selectively expel blowdown exhaust gasses from the combustion chamber during a recompression stroke;
  - an intake valve adapted to open and close to selectively introduce air into the combustion chamber during an intake stroke; and
  - a blowdown compressor intake valve adapted to selectively open and close to introduce air into the combustion chamber;
- an exhaust line communicating with the combustion chamber and a turbine, the exhaust line directing the exhaust gasses expelled from the exhaust valve to drive the turbine;
- a compressor adapted to be driven by the turbine;
- an intake line communicating with the combustion chamber and the compressor, the intake line:
  - receiving compressed air from the compressor; and
  - directing a portion of the compressed air into the combustion chamber through the intake valve;
- a blowdown exhaust line communicating with the combustion chamber and a blowdown turbine, the blowdown exhaust line directing blowdown exhaust gasses expelled from the blowdown exhaust valve to drive the blowdown turbine, the blowdown exhaust line being separate from the exhaust line connected to an inlet of the turbine;
- a blowdown compressor adapted to be driven by the blowdown turbine; and
- a blowdown compressor line communicating with the combustion chamber, the blowdown compressor, and the intake line downstream of the compressor, the blowdown compressor line:
  - directing a portion of the compressed air from the intake line into the blowdown compressor; and
  - directing super-compressed air from the blowdown compressor into the combustion chamber through the blowdown compressor intake valve;
- wherein the super-compressed air is introduced through the blowdown compressor intake valve into the combustion chamber during the recompression stroke.

15. The machine of claim 14, wherein the blowdown turbine and the turbine are driven in parallel.

16. The machine of claim 14, further comprising a high-pressure EGR line fluidly communicating with the exhaust line and the intake line, wherein the high-pressure EGR line is adapted to direct at least a portion of the exhaust gasses from the exhaust line to the intake line.

17. The machine of claim 14, further comprising a controller configured to:
- receive a signal indicative of a first engine parameter;
- determine a second engine parameter setpoint based on the first engine parameter;
- receive a signal indicative of a second engine parameter; and
- compare the second engine parameter setpoint to the second engine parameter.

18. The machine of claim 17, wherein the controller is further configured to adjust a time duration that the blowdown exhaust valve remains open using a difference between the second engine parameter setpoint and the second engine parameter as a primary control parameter.

19. The machine of claim 17, wherein the controller is further configured to adjust a time duration that the blowdown compressor intake valve remains open based on the difference between the second engine parameter setpoint and the second engine parameter.

20. The machine of claim 18, wherein the controller is further configured to adjust a time duration that the blowdown compressor intake valve remains open based on the difference between the second engine parameter setpoint and the second engine parameter.

* * * * *